A. PLUMMER.
CLUTCH ACTUATING MEANS FOR AIR COMPRESSING MECHANIS
APPLICATION FILED JAN. 27, 1914.
1,197,539.
Patented Sept. 5, 1916.
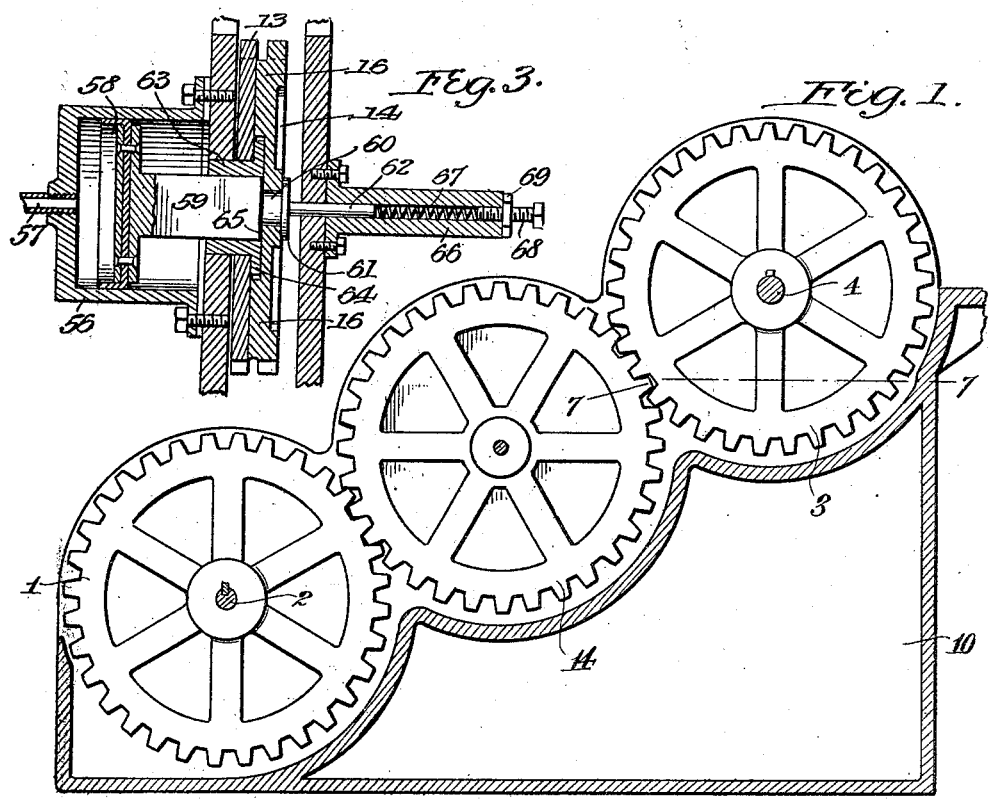
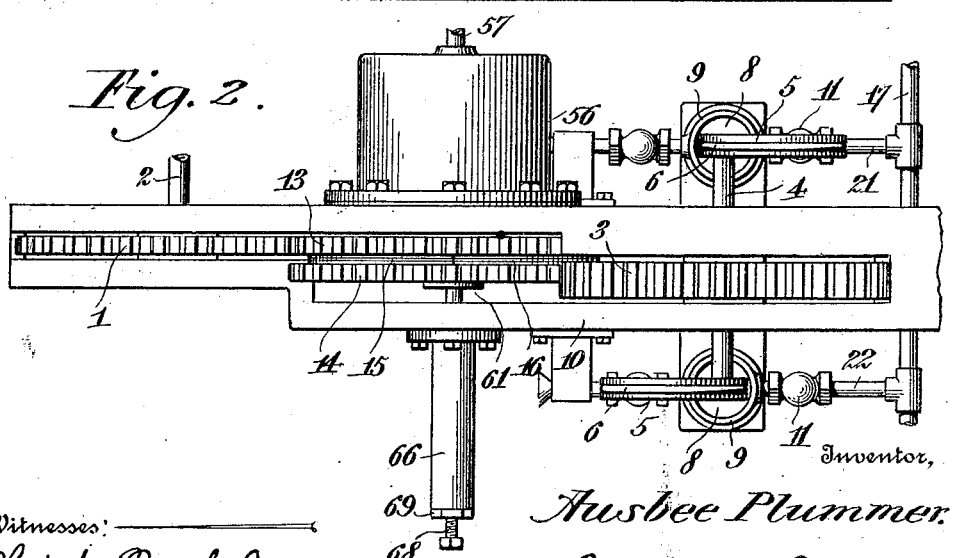

UNITED STATES PATENT OFFICE.

AUSBEE PLUMMER, OF SHAFT, MARYLAND.

CLUTCH-ACTUATING MEANS FOR AIR-COMPRESSING MECHANISM.

1,197,539.　　　　　　　　Specification of Letters Patent.　　　Patented Sept. 5, 1916.

Application filed January 27, 1914.　Serial No. 814,757.

*To all whom it may concern:*

Be it known that I, AUSBEE PLUMMER, a citizen of the United States, residing at Shaft, in the county of Allegany and State of Maryland, have invented new and useful Improvements in Clutch-Actuating Means for Air-Compressing Mechanism, of which the following is a specification.

This invention relates to clutch actuating mechanism for air brake systems as applied to automobiles and other motor vehicles, the object of the invention being to produce simple, economical and reliable mechanism which automatically controls air compressing and storing means, said mechanism being operable from a rotating element of the internal combustion engine used on said vehicle, the air so compressed and stored being used in the application of the brake or brakes.

A further object of the invention is to provide driving gearing for the air compressor of such construction and arrangement in relation to the stored supply of compressed air, that, when a predetermined pressure of air is obtained in the storage space, the clutch actuating mechanism which controls the operation of the air compressor will be automatically thrown out of operation, to be again automatically restored to operative condition when the pressure falls below the predetermined point.

With the above and other objects in view, the invention consists in the construction, combination and arrangement of parts, as will be hereinafter more fully described, illustrated and claimed.

In the accompanying drawings:—Figure 1 is a vertical cross section through the air compressor illustrating the arrangement of the driving gearing which actuates the air compressor. Fig. 2 is a top plan view of the compressor, showing the train of gears. Fig. 3 is a vertical longitudinal section through the clutch mechanism and intermediate gears.

In the preferred embodiment of this invention, I employ a driving wheel 1 fast on the cam shaft 2 of the engine, this being the most convenient way of driving the air compressor although it will be apparent as the description proceeds that said driving wheel 1 may be mounted upon and actuated from another rotating shaft of the engine such, for example, as the crank shaft or circulating pump shaft or the magneto shaft. It is, however, preferred to place the driving wheel on the cam shaft.

3 designates the driven wheel which is mounted fast on a rotary compressor shaft 4 provided at opposite sides of the wheel 3 with eccentrics 5 around which straps 6 work, said straps being connected to the plunger rods 7 which carry pistons 8 mounted to reciprocate in a pair of pump cylinders 9 located on opposite sides of a gear case 10 in which the wheels of the compressor driving mechanism are housed as illustrated in the drawings to exclude foreign matter therefrom and to retain oil or other lubricant in said case and around said wheels.

Each of the pump cylinders 9 is fastened to the gear case 10 in rigid relation thereto and embodies an outlet check valve casing 11 in which is arranged an automatic check valve 12.

Between the driving gear 1 and the driven gear 3, intermediate gears or wheels 13 and 14 are mounted, said intermediate wheels having their axes of rotation coincident. Both of the wheels 13 and 14 are provided on their adjacent abutting sides with clutch faces 15 and 16 and when said clutch faces are engaged, both of said wheels 13 and 14 rotate in unison. The wheel 13 meshes with and is constantly driven by the driving wheel 1 on the cam shaft and the teeth of said wheel 13 are out of line with the teeth of the driven wheel 3 of the compressor. The other wheel 14 is in constant mesh with the wheel 3 whether it be in clutched engagement with the wheel 13 or not and in order to allow for the movement of the wheel 14 toward and away from the wheel 13, the working face of the driven wheel 3 is relatively wide as shown in the drawings thus permitting the sliding movement of the wheel 14 without throwing said gear 14 out of mesh with the wheel 3.

17 designates a manifold pipe which leads along one side of the engine base and the air compressor and communicates with a reservoir or compressed air tank 18 secured to the frame of the machine, said compressed air tank not shown. Pipes or connections 21 and 22 lead from the check valve chambers 11 of the pumps into said manifold so that the compressed air is delivered from the pumps into said manifold and through the manifold into the reservoir.

The means for shifting the wheel 14 will now be described, the same being illustrated in detail in Fig. 3. 56 designates an air cylinder secured to the gear case 10 in concentric relation to the gears 13 and 14, and 57 designates a tubular connection leading from the manifold hereinabove described to said cylinder so that the same air pressure is contained in the cylinder 56 as in the manifold and reservoir. Within the cylinder 56 is a piston 58 and extending from the center of said piston 58 is a rod embodying a squared portion 59, a round or journal portion 60, a fixed collar 61 and a reduced plunger stem 62. The squared portion 59 of the piston rod passes through a fixed bearing 63 upon which the wheel 13 above referred to is journaled so as to turn freely thereon, said wheel 13 being held between the adjacent wall of the gear case 10 and a flange 64 on the bearing 63 as shown in Fig. 3.

The wheel 14 is free to turn on the round or journal portion 60 of the piston rod and is confined between the bearing 63 and the fixed collar 61 above referred to. The journal portion 60 is of less diameter than the squared portion 59 thereby forming a thrust shoulder 65 which, when the piston 58 is actuated toward the gear case, pushes the wheel 14 away from the wheel 13 and disengages the clutch faces 15 and 16.

The stem 62 projects into a tubular guide and spring housing 66 at the opposite side of the gear case, 67 designating an expansion spring contained in said housing and confined between a tension screw 68 threaded into the outer end of said housing and the adjacent end of the plunger or stem 62. The spring 67 serves to press the wheel 14 toward the wheel 13 when the air pressure is released from the cylinder 56, also returning the piston 58 to its initial position. By adjusting the screw 68 the pressure at which the compressor is to be thrown out of operation may be regulated and when the tension screw 68 is adjusted to the desired point, it may be locked by means of a jam nut 69.

From the foregoing description it will now be seen that as the engine of the motor vehicle operates, the gearing above described will drive the air compressor so as to compress air in the manifold and reservoir. When the predetermined pressure, governed by the tension of the spring 67, is reached, the compressed air entering the cylinder 56 operates on the piston 58 and thrusts the wheel 14 away from the wheel 13 so that the wheel 14 is no longer driven and therefore it cannot drive the driven wheel 3 of the air compressor. The air compressor is thus automatically thrown out of operation while the wheels 1 and 13 continue in operation. As soon as the pressure is reduced below said predetermined point, the spring 67 operates in the manner described to restore the wheel 14 to its operative position and thereupon the air compressor resumes its operation. Thus the air compressor is automatically thrown into and out of operation.

What I claim is:—

In air brakes for automobiles, the combination of a disk-shaped driving clutch member and a disk-shaped driven clutch member having their axes in line with each other, and shifting means for moving the working face of one of said clutch members into and out of contact with the working face of the other clutch member, said shifting means embodying a compressed air cylinder, a piston therein, a rod attached directly to and extending from said piston and slidable through the center of one of said clutch members and having a shouldered engagement with the other clutch member, the latter being journaled on said rod, said piston rod operating automatically upon a predetermined air pressure in said cylinder to separate the working faces of the clutch members, and a spring bearing directly against said piston rod for restoring the contactual relation of the clutch members when the air pressure in said cylinder falls below a predetermined point.

In testimony whereof I affix my signature in presence of two witnesses.

AUSBEE PLUMMER.

Witnesses:
GEO. H. PLUMMER,
D. H. PLUMMER.

Copies of this patent may be obtained for five cents each, by addressing the "Commissioner of Patents, Washington, D. C."